Patented Aug. 8, 1950

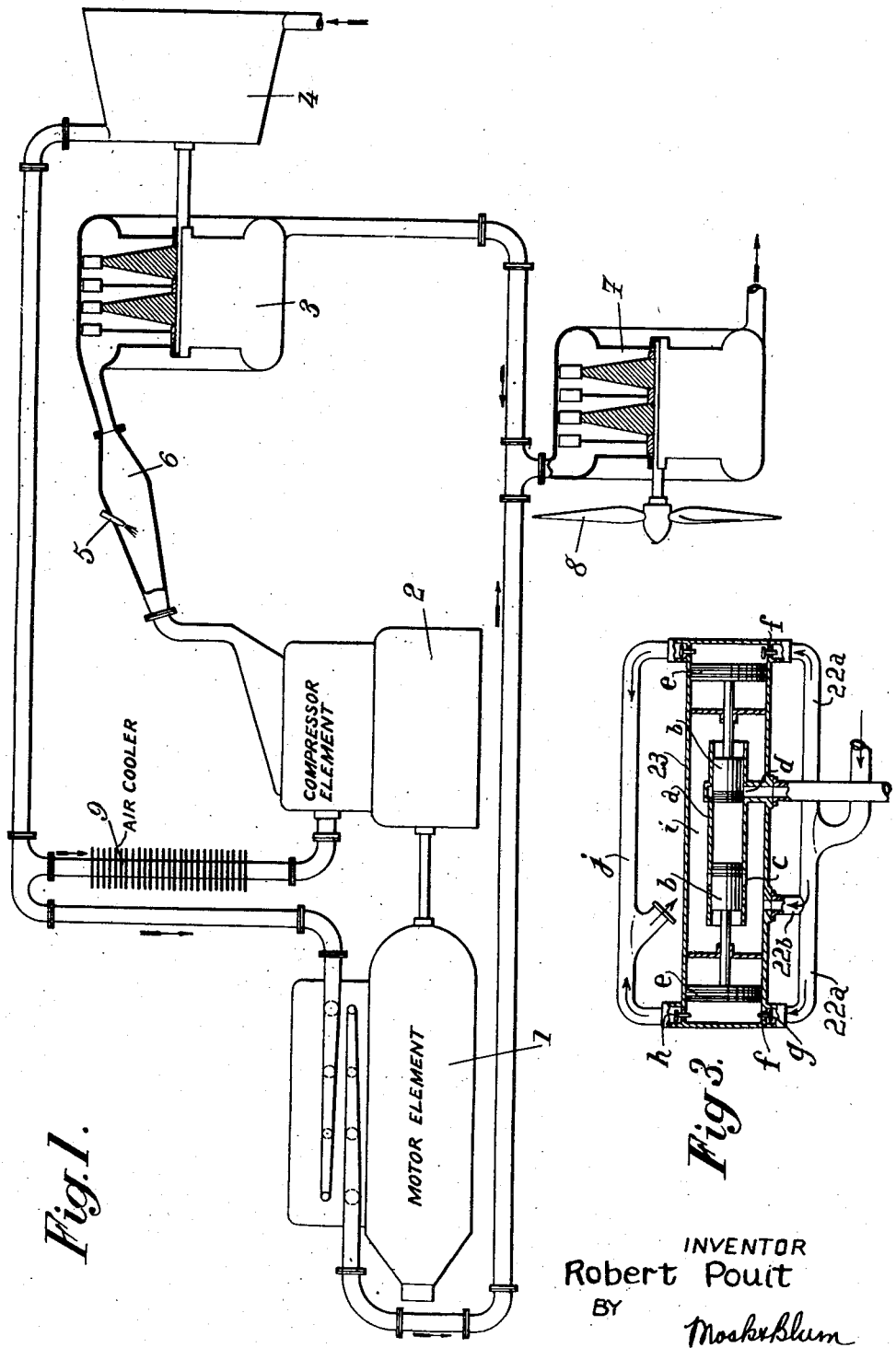

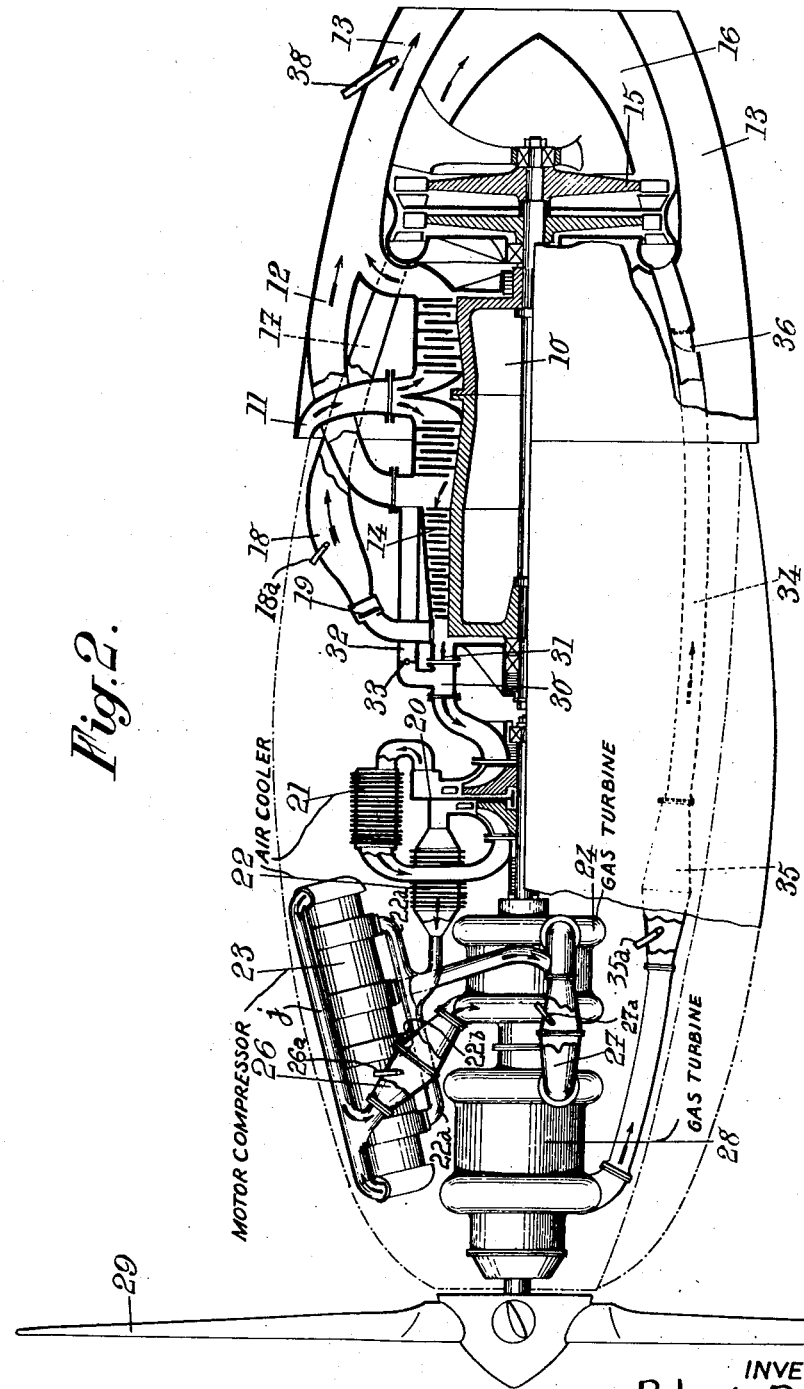

2,518,062

UNITED STATES PATENT OFFICE 2,518,062

AIRCRAFT POWER PLANT WITH MOTOR-COMPRESSOR GROUP AND TURBO-COMPRESSOR GROUP

Robert Pouit, Lyon, France, assignor to Societe Industrielle Generale de Mecanique Appliquee (S. I. G. M. A.), Villeurbanne, France, a society of the Republic of France Application November 29, 1947, Serial No. 788,935
In France September 23, 1947

6 Claims. (Cl. 60—13)

The present invention relates to power plants and more especially, but not exclusively, to power plants for use on flying machines.

Its object is to provide a power plant of this kind which is better adapted to meet the requirements of practice than those used up to the present time.

Preferred embodiments of my invention will be hereinafter described with reference to the accompanying drawings, given merely by way of example, and in which:

Fig. 1 of these drawings diagrammatically shows a plant made according to a first embodiment of the invention;

Fig. 2 shows, also diagrammatically, and in longitudinal section, a plant made according to a second embodiment of the invention;

Figure 3 is a sectional view showing the parallel arrangement of the supercharging conduits to the motor and the compressor.

It has already been proposed, in order to obtain a supply of fluid for propelling an aircraft, to make use of an auto-generator group, that is to say a group including a motor element and a compressor element mechanically driven by said motor element, the air compressed by the compressor element being used for scavenging and supercharging the motor element, from the outlet apertures of which issues a gaseous stream constituted by the incompletely expanded combustion gases and the excess of scavenging air. Such groups have a high thermal efficiency, since the fuel injected into the motor element burns in highly compressed air.

But auto-generators are generally heavy and cumbersome.

The object of my invention is to provide a power plant which avoids these drawbacks while keeping a high thermal efficiency. For this purpose, according to an essential feature of said invention, I use, instead of an auto-generator group, a motor-compressor group in which the motor element, on the one hand, and the compressor element mechanically driven by the motor element, on the other hand, are mounted in parallel concerning the gaseous streams that flow through these two elements. Furthermore, and still according to the main feature of my invention, said motor and compressor elements of the motor-compressor group are supercharged by means of air supplied by the blower element of a turbo-blower the turbine element of which is supplied with at least a portion of the air compressed by the compressor element of the motor-compressor, which air has been heated by injection and combustion therein of a certain amount of fuel, and I use as motive fluid, intended to be supplied either to a gas turbine or to a reaction nozzle, or again both to a gas turbine and to a reaction nozzle, the exhaust gases from the motor element of the motor-compressor and the exhaust gases from the turbine element of the supercharging turbo-blower, the two exhaust gas streams being advantageously mixed together after expansion thereof down to the same pressure.

The dimensions of the motor and compressor elements of such a group can be considerably smaller than those of an equivalent auto-generator, which ensures a reduction of weight and volume of the plant.

As for the supercharging turbo-blower, its dimensions are also reduced, owing to the high value of the mean pressure in the turbine element and to the high speed of revolution of this kind of machine.

On the other hand the thermal efficiency is high since both the combustion in the motor element of the motor-compressor and that in the air supplied by the compressor element have the benefit of a high rate of preliminary compression.

A first plant made according to the invention is shown by Fig. 1. This plant essentially includes:

On the one hand, a motor-compressor group including a motor element 1 of the piston type and a compressor element 2, for instance also of the piston type, the compressor element being mechanically driven by the motor element, on the other hand, a turbo-blower group including a gas turbine element 3 and a rotary compressor element 4, the turbine element being fed with air supplied by the compressor element 2 of the motor compressor, into which air a certain amount of fuel has been injected and burned by means of an injector 5 mounted on a combustion chamber 6, whereas the compressor element 4 of said turbo-blower serves to supercharge in parallel the motor element 1 and the compressor element 2 of the motor-compressor, finally, a device fed with the motive gases supplied by the above mentioned devices and constituted, for instance, by a gas turbine 7 driving an airscrew 8.

Concerning the arrangement of the motor-compressor, it is made to include a multi-cylinder engine of the connecting rod and crankshaft type which drives compressor 2, which may be a piston compressor. As a rule, it may be advantageous to interpose cooling means 9 in the conduit which conveys a portion of the air compressed by blower 4 toward the compressor element 2 of the motor-compressor. Furthermore, the exhaust gases from the motor element 1 of the motor-compressor and from the turbine element 3 of the turbo-blower should preferably have substantially the same pressure so that it is possible to mix together these two streams of exhaust gases, before introducing them into the device for receiving these gases, for instance turbine 7.

Concerning the ratios of compression or expansion of the various devices of the plant illustrated by Fig. 1, when the turbo-blower is sucking in air from the atmosphere near the ground, they may be as follows:

Compression in blower 4: from 1 absolute atmosphere to 5 absolute atmospheres,

Compression in compressor 2: from 5 absolute atmospheres to 20 absolute atmospheres, Rate of expansion in turbine 3: from 20 absolute atmospheres to 5 absolute atmospheres.

In this example, which is given merely by way of indication, the feed pressure of turbine 7 is equal to about 5 absolute atmospheres. The amount of fuel injected into combustion chamber 6 is determined so that the temperature at the inlet of turbine 3 does not exceed 800° C.

The plant shown by Fig. 2 is made of two portions: a low pressure portion and a high pressure portion, which two portions can work, at will, either in series or in parallel. The low pressure portion is constituted by a two-flux turbo-reactor of a known system, whereas the high pressure portion is constituted by a system made according to the main feature of my invention.

Concerning the turbo-reactor which constitutes the low pressure portion, it includes, for instance, a low pressure rotary compressor 10 having an air intake 11 and the output of which is connected, on the one hand through conduits 12 to a reaction nozzle 13 and, on the other hand, to an intermediate pressure compressor 14 coaxial with the low pressure compressor 10.

This low pressure portion further includes a gas turbine 15 the exhaust of which is in communication with a reaction nozzle 16 and I interpose, between the output of intermediate pressure compressor 14 and the intake of turbine 15, a conduit 17 provided with a combustion chamber 18 and fuel injector 18a and, on the upstream side of this chamber, with a valve 19.

Concerning the high pressure portion it includes a high pressure compressor 20 having, for instance, two centrifugal stages with a cooler 21 between these two stages and a cooler 22 on the downstream side of the second stage, this compressor 20 serving to supercharge in parallel the motor and compressor portions of motor-compressor 23 through conduits 22a and 22b as shown in detail by Figure 3. In the latter figure, a cylinder motor a has opposed pistons b travelling therein which control the opening of entry c and the escape d of the cylinder motor. Each of the pistons b is connected to a compressor piston e which work in compressor cylinder f provided with valves g and h. A part of the air compressed by compressor 20, after traversing the coolers 21 and 22 is carried by conduits 22b to the interior of casing i, which surrounds the cylinder motor a and serves as a reservoir for the air. Another portion of the air is carried by the conduits 22a to the compressor cylinder f where it is compressed and into conduit j which communicates with the combustion chamber 26.

Said high pressure portion further includes a gas turbine 24 which drives said high pressure compressor 20 and forms together therewith the turbo-blower group, the turbine 24 of this group being fed with the air discharged by the compressor portion of the motor-compressor 23 and heated by fuel injected by a fuel injector 26a into a combustion chamber 26.

Air is caused to expand into turbine 24 down to a pressure approximating the pressure of the exhaust gases of the motor element of motor-compressor 23 and the exhaust gases from said motor element of the motor-compressor are mixed with the exhaust gases from turbine 24 in a chamber 27 where a supplementary amount of fuel supplied by an injector 27a may be burned in said mixture.

This mixture is fed to a gas turbine 28 which drives an airscrew 29.

Concerning the communications to be provided between the high and low pressure portions, they are advantageously constituted:

On the one hand by a conduit 30 provided with a shutter 31 and which connects the output of intermediate pressure compressor 14 with the intake of high pressure compressor 20, and also by a conduit 32 provided with a shutter 33 and which connects the output of the low pressure compressor 10 with the intake of high pressure compressor 20, and On the other hand, by a conduit 34 connecting the exhaust of turbine 28, which belongs to the high pressure portion of the plant, with the intake of turbine 15 which belongs to the low pressure portion of the plant, a fuel combustion chamber 35, with a fuel injector 35a, being preferably interposed in conduit 34 which can be separated by means of valve 36 from the intake of turbine 15 to be connected with reaction nozzle 13.

In the conduit or conduits which supply compressed air to nozzle or nozzles 13 I may provide one or several fuel injectors such as 38 which serve to heat the air supplied to said nozzles.

The operation of the plant illustrated by Fig. 2 is as follows:

According to the altitude of flight of the aircraft on which the plant shown by Fig. 2 is fitted, the low pressure and high pressure portions of the plant are connected either in series (high altitude) or in parallel (low altitude).

When the system is working in series, shutters or valves 19, 31, 33 and 36 are in the position shown in the drawing, that is to say valves 19 and 33 close conduits 17 and 32 respectively, whereas shutter 31 opens conduit 30 and shutter 36 connects the exhaust of turbine 28 with the intake of turbine 15.

The air sucked in from the atmosphere at 11 is compressed a first time in low pressure compressor 10 and is discharged partly directly into nozzles 13 and partly into intermediate pressure compressor 14. This air is compressed a second time in this second compressor and is then fed, through conduit 30, to the intake of the high pressure compressor 20 which compresses this air for the third time so as to supercharge by means of this air, on the one hand the motor element and, on the other hand the compressor element of motor-compressor 23. The air compressed by the compressor element of this motor compressor is supplied to combustion chamber 26 into which a certain amount of fuel is injected and burns in said air which, subsequently enters the turbine 24 of the turbo-blower 20, 24. This air expands in turbine 24 at a pressure approximating the pressure with which the mixture of combustion gas and of scavenging air escapes from the motor element of the motor-compressor, whereby the two gaseous currents constituted, on the one hand by the gases escaping from turbine 24, and, on the other hand, by the gases escaping from the motor element of the motor-compressor can be mixed together and introduced into combustion chamber 27 where a further amount of fuel is burned in the mixture which is subsequently introduced into turbine 28. The gases, after they have expanded in this last mentioned turbine, are fed through conduit 34 into turbine 15, eventually after they have been heated once more in combustion chamber 35. After their expansion in turbine 15, the exhaust gases escape into the atmosphere through reaction nozzle 16.

For parallel operation of the low pressure and high pressure portions, shutters 19 and 33 are opened, shutter 31 is closed and shutter 36 is given the position for which it connects conduit 34 with reaction nozzle or nozzles 13. For this operation in parallel, low pressure compressor 10 supplies in parallel, on the one hand the intermediate pressure compressor 14 and, on the other hand the high pressure compressor 20. The air compressed by intermediate pressure compressor 14 is introduced into combustion chamber 18 from which it is fed to the intake of turbine 15 to escape, after it has expanded in this turbine, through reaction nozzle 16, into the surrounding atmosphere. The air compressed by high pressure compressor 20 flows in the manner above indicated through motor-compressor 23 and turbines 24 and 28 to escape subsequently into the surrounding atmosphere through nozzle or nozzles 13 which also receive, directly through conduits 12, a portion of the air that has been compressed by low pressure compressor 10.

The working in parallel is used in particular near the ground for taking off.

The plant according to my invention might be a stationary plant or a plant intended to propel a land vehicle.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A power plant which comprises, in combination, a motor-compressor group including a motor element and a compressor element mechanically driven by said motor element, a turbo-compressor group including a turbine and a blower mechanically driven by said turbine, means for feeding at least a portion of the output of said compressor element to the intake of said turbine, means for supercharging said motor and compressor elements in parallel from the output of said blower, and a fluid driven energy receiver having its intake connected with the exhausts of said motor element and said turbine.

2. A power plant which comprises, in combination, a motor-compressor group including a motor element and a compressor element mechanically driven by said motor element, a turbo-compressor group including a turbine and a blower mechanically driven by said turbine, means for feeding at least a portion of the output of said compressor element to the intake of said turbine, means for supercharging said motor and compressor elements in parallel from the output of said blower, and a gas turbine having its intake connected with the exhausts of said motor element and said turbine.

3. A power plant which comprises, in combination, a motor-compressor group including a motor element and a compressor element mechanically driven by said motor element, a turbo-compressor group including a turbine and a blower mechanically driven by said turbine, means for feeding at least a portion of the output of said compressor element to the intake of said turbine, means for supercharging said motor and compressor elements in parallel from the output of said blower, means for cooling the fluid stream on its way from said blower toward said compressor element, and a fluid driven energy receiver having its intake connected with the exhausts of said motor element and said turbine.

4. A power plant which comprises, in combination, a motor-compressor group including a motor element and a compressor element mechanically driven by said motor element, a turbo-compressor group including a turbine and a blower mechanically driven by said turbine, means for feeding at least a portion of the output of said compressor element to the intake of said turbine, means for injecting and burning fuel in the fluid on its way from said compressor element to said turbine, means for supercharging said motor and compressor elements in parallel from the output of said blower, and a fluid driven energy receiver having its intake connected with the exhausts of said motor element and said turbine.

5. A power plant which comprises, in combination, a motor-compressor group including a motor element and a compressor element mechanically driven by said motor element, a turbo-compressor group including a turbine and a blower mechanically driven by said turbine, means for feeding at least a portion of the output of said compressor element to the intake of said turbine, means for injecting and burning fuel in the fluid on its way from said compressor element to said turbine, means for supercharging said motor and compressor elements in parallel from the output of said blower, and a gas turbine having its intake connected with the exhausts of said motor element and said turbine.

6. A power plant which comprises, in combination, a motor-compressor group including a motor element and a compressor element mechanically driven by said motor element, a turbo-compressor group including a turbine and a blower mechanically driven by said turbine, means for feeding at least a portion of the output of said compressor element to the intake of said turbine, means for injecting and burning fuel in the fluid on its way from said compressor element to said turbine, means for supercharging said motor and compressor elements in parallel from the output of said blower, means for cooling the fluid stream on its way from said blower toward said compressor element, and a fluid driven energy receiver having its intake connected with the exhausts of said motor element and said turbine.

ROBERT POUIT.

REFERENCES CITED

The following references are of record in the file of this patent:

UNITED STATES PATENTS

| Number | Name | Date |
|---|---|---|
| 2,292,288 | Pateras Pescara | Aug. 4, 1942 |

FOREIGN PATENTS

| Number | Country | Date |
|---|---|---|
| 502,758 | Great Britain | Mar. 24, 1939 |